G. CROMPTON & H. WYMAN.
Shuttle Box Mechanism for Looms.
No. 229,967.  Patented July 13, 1880.
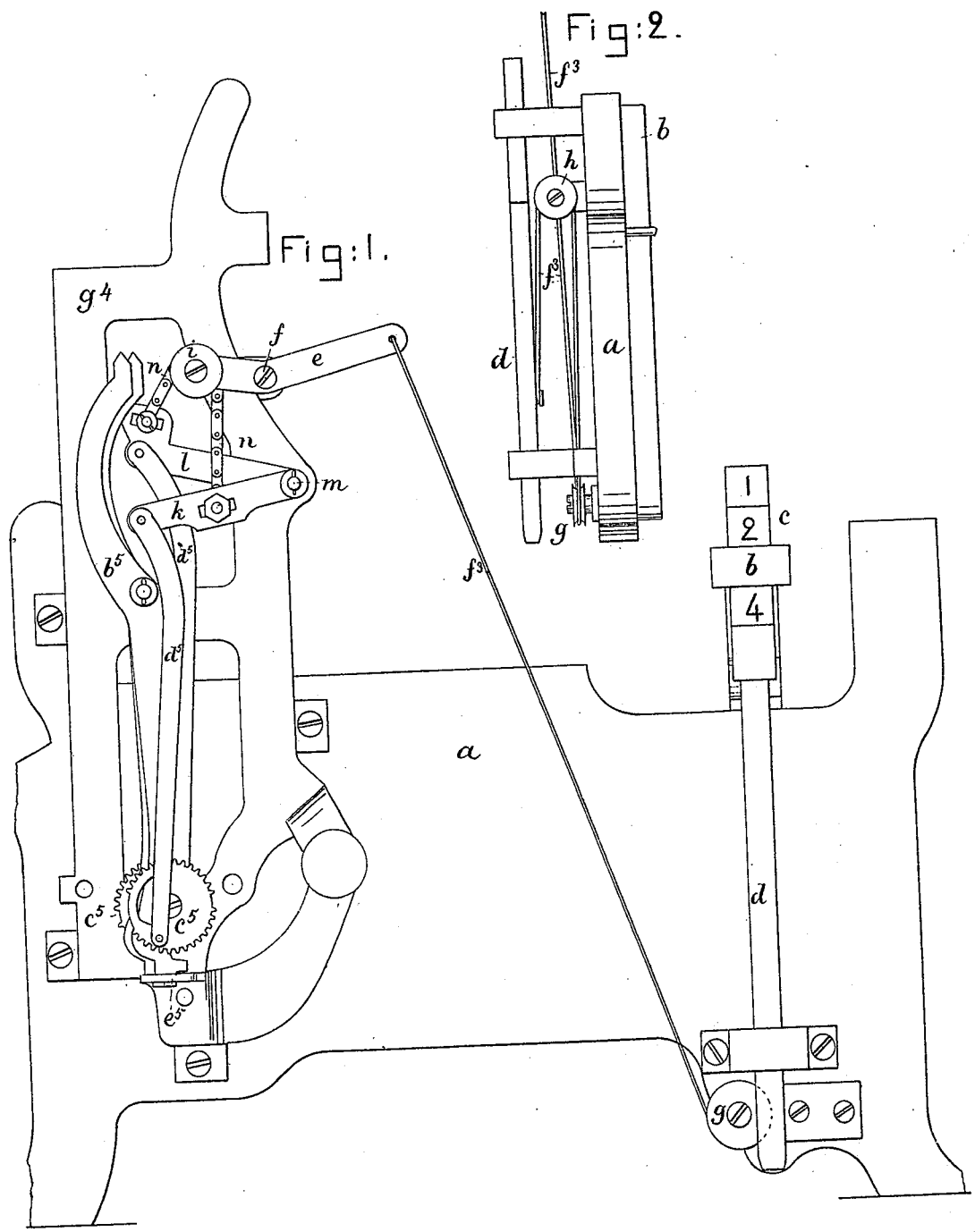
Witnesses.
Jos. P. Livermore
L. F. Connor.
Inventor.
George Crompton and Horace Wyman
by Crosby & Gregory Atty.

UNITED STATES PATENT OFFICE.

GEORGE CROMPTON AND HORACE WYMAN, OF WORCESTER, MASSACHUSETTS, ASSIGNORS TO SAID GEORGE CROMPTON.

SHUTTLE-BOX MECHANISM FOR LOOMS.

SPECIFICATION forming part of Letters Patent No. 229,967, dated July 13, 1880.

Application filed December 10, 1879.

*To all whom it may concern:*

Be it known that we, GEORGE CROMPTON and HORACE WYMAN, both of the city and county of Worcester, and State of Massachusetts, have invented an Improvement in Shuttle-Box Mechanism for Looms, of which the following description, in connection with the accompanying drawings, is a specification.

This invention relates to mechanism for operating a series of drop shuttle-boxes, and, as herein shown, is adapted to move a series of four boxes and place any one of them in working position opposite the race-board of the lay.

In this our invention the shuttle-box lever, attached at one end by cording or chain to the shuttle-box rod, provided at its other end with a pulley, is actuated by a short chain connected with short vibratable levers at different distances from their fulcra, and the said short levers are actuated by the usual connecting-rods and toothed cranks common to looms now in use.

In this our invention we are enabled to use very short levers in a small space.

Figure 1 represents, in side elevation, sufficient of our improvement to enable those conversant with looms to fully understand the same, and Fig. 2 an elevation of only the front end of Fig. 1.

Before proceeding to particularly point out the present improvements, we will say that $a$ is supposed to represent the end of an ordinary loom-frame; $b$, the lay; $c$, the shuttle-boxes; $d$, the box-rod; $c^5$, semi-rotatable toothed cranks, and $d^5$ connecting-rods extended therefrom. These parts are all old and in common use. These toothed cranks may have motion imparted to them intermittingly by devices, substantially as in United States Letters Patent No. 209,714, November 5, 1878, to which reference may be had, or by means of devices as shown in an application for patent filed November 21, 1879, by us. This latter application shows the shifting-levers $b^5$, and mechanism to change them, according to the projections of the pattern-surface, to cause the engagement and rotation of the toothed cranks $c^5$ in the desired direction, and also shows the guide $e^5$ for the lower ends of the said shifting-levers, so they need not be herein further described, as they are not claimed.

The shuttle-box lever $e$, pivoted at $f$ to the frame part $g^4$, has its forward end attached to the shuttle-box rod $d$ by means of a flexible cord or chain, $f^3$, of usual construction, it being passed from the lever $e$ under a pulley, $g$, and over a pulley, $h$, carried by the lay, (see Fig. 2,) after which it is joined with the box-rod.

The boxes, in practice, will descend by gravity.

The shuttle-box lever $e$, at its rear end, is provided with a sheave, $i$.

The connecting-rods $d^5$, of usual form, two being used, are attached at their upper ends to the end of the actuating-levers $k$ $l$, pivoted at $m$. A short chain, $n$, in actual use but a few inches long, is connected at its opposite ends with the said levers $k$ $l$ at different distances from their fulcra, as shown in Fig. 1, and the central part of the chain is extended over the sheave of the said shuttle-box lever.

In the drawings, the lever $k$ is shown in its lowest, and the lever $l$ in its highest position, which so operates the box-lever $e$ as to place No. 2 shuttle-box at the race-level. If both levers are down box No. 4 will be placed in position; if both levers are up box No. 1, and if $l$ is down and $k$ up box No. 3 will be placed in operating position.

We claim—

The two connecting-rods and mechanism for operating the same, two pivoted levers, $k$ $l$, and a chain or flexible connection attached at its opposite ends to the said levers at different distances from their fulcra, combined with a pivoted shuttle-box lever, $e$, provided at one end with a sheave over which the said chain is extended, a tier of shuttle-boxes, and mechanism to connect the said shuttle-box lever therewith, whereby any one of a tier of four shuttle-boxes may be brought into working position, substantially as described.

In testimony whereof we have signed our names to this specification in the presence of two subscribing witnesses.

GEO. CROMPTON.
HORACE WYMAN.

Witnesses:
J. B. SYME,
J. A. WARE.